(12) United States Patent
Agata et al.

(10) Patent No.: US 6,474,823 B1
(45) Date of Patent: Nov. 5, 2002

(54) ILLUMINATING DEVICE AND INFORMATION PROCESSING DEVICE

(75) Inventors: Kenichi Agata, Tokyo; Yuichiro Hisakawa, Nagano; Kaoru Hayashi, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 16 days.

(21) Appl. No.: 09/667,396

(22) Filed: Sep. 20, 2000

(30) Foreign Application Priority Data

Sep. 21, 1999 (JP) .......................................... 11-267756

(51) Int. Cl.⁷ .............................................. G01D 11/28
(52) U.S. Cl. ........................... 362/26; 362/85; 362/109; 362/561; 349/58; 349/63; 349/61
(58) Field of Search .............................. 349/58, 61, 63; 362/26, 31, 85, 28, 109, 561; 361/681, 686; 345/905

(56) References Cited

U.S. PATENT DOCUMENTS

| | | | | |
|---|---|---|---|---|
| 5,091,832 A | * | 2/1992 | Tortola et al. | 362/109 |
| 5,144,290 A | * | 9/1992 | Honda et al. | 345/905 X |
| 5,777,704 A | * | 7/1998 | Selker | 349/58 |
| 5,815,225 A | * | 9/1998 | Nelson | 362/31 X |
| 6,088,074 A | * | 7/2000 | Suzuki | 362/31 X |

* cited by examiner

*Primary Examiner*—Stephen Husar
(74) *Attorney, Agent, or Firm*—Frommer Lawrence & Haug LLP; William S. Frommer; Matthew K. Ryan

(57) ABSTRACT

An illuminating device and an information processing device are proposed to increase the portability of the reflex liquid crystal display. According to the present invention, in the display unit equipped with the reflex liquid crystal display of the notebook PC which is an information processing device, since the illuminating device, that is the front light unit having the predetermined light source and the light guiding plate to guide the light to be obtained from the light source is attached removable free so that the light will be irradiated evenly over the entire surface of the display screen of the reflex liquid crystal display via the light guiding plate, and the predetermined information to be displayed on the display screen will be transmitted through, as sufficient lights can be irradiated over the display screen under the poor lighting condition to the display screen of the reflex liquid crystal display, and can be easily detached when carrying the reflex liquid crystal display. And thereby the illuminating device and the information processing device capable of increasing the portability of the reflex liquid crystal display can be realized.

10 Claims, 14 Drawing Sheets

ILLUMINATING DEVICE AND INFORMATION PROCESSING DEVICE

BACKGROUND OF THE INVENTION

1. Field of the Invention

The present invention relates to an illuminating device and an information processing device, and more particularly, is suitably applied to the illuminating device to be used in the reflex liquid crystal display formed of liquid crystal display (LCD) and the notebook type personal computer (hereinafter referred to as notebook PC) equipped with the reflex liquid crystal display.

2. Description of the Related Art

Heretofore, there has been a translucent liquid crystal display as the liquid crystal display. Such translucent liquid crystal display comprises liquid crystal layer which is formed by sealing in the liquid crystal between a pair of transparent substrates and is provided with the light source such as a cathode-ray tube called as back-light on the rear surface of the liquid crystal layer.

Moreover, in the translucent liquid crystal display, the light is transmitted through the liquid crystal layer by illuminating the back surface side of the liquid crystal layer using the light obtained by lighting up the back light. With this arrangement, in the translucent liquid crystal display, the predetermined information displayed on the display screen comprised of liquid crystal layer can be seen from the front side.

In the translucent liquid crystal display, the consumption of electric power is comparatively large because the back light is used. And as for the liquid crystal display, the reflex liquid crystal display has been used in place of the translucent liquid crystal display.

In the reflex liquid crystal display, a reflection plate is placed on the back side of the liquid crystal layer, and reflecting the outside light such as natural light injected from the front surface of the liquid crystal layer at the reflection plate and transmitting the light through the liquid crystal, the liquid crystal layer is lighted up. Thus, in the reflex liquid crystal display, the predetermined information displayed on the display screen can be seen from the front surface side, and thus, the consumption of the electric power can be remarkably decreased for not using the back light.

However, in the reflex liquid crystal display, since it is difficult to light up the liquid crystal layer sufficiently due to poor lighting condition at night, the visibility of information displayed on the display screen is deteriorated remarkably. Thus, in order to use the reflex liquid crystal display under the poor outside light condition, it is required that the light source is placed on the front surface side of the reflex LC display and irradiated to the liquid crystal layer.

However, if the light source is placed on the front side of the reflex liquid crystal display, the volume of the light source becomes large when carrying out the reflex liquid crystal display and it has been difficult to carry it around.

SUMMARY OF THE INVENTION

In view of the foregoing, an object of this invention is to provide an illuminating device and an information processing device capable of facilitating the carrying of the reflex liquid crystal display.

The foregoing objects and other objects of the invention have been achieved by the provision of an illuminating device which comprises a prescribed light source, a light guiding plate for guiding the light to be obtained from the light source, and the holding means for holding the light source and the light guiding plate, which is attached removable-free to the reflex liquid crystal display, in order to irradiate the light evenly over the entire surface of the display screen of the reflex liquid crystal display via the light guiding plate and to transmit the predetermined information to be displayed on the display screen.

Accordingly, under the condition of poor outside light to the display screen of the reflex liquid crystal display, the sufficient light can be irradiated to the display screen and at the same time, it can be removed easily when carrying out the reflex liquid crystal display.

Furthermore, according to the present invention, in the information processing device, the main unit to execute the predetermined processing, the display unit attached open/close free to the main unit and equipped with a reflex liquid crystal display, and the lighting means having the predetermined light source and a light guiding plate to guide the lights to be obtained from the light source and attached removable-free to the display unit so that light will be irradiated evenly over the entire surface of the display screen of the reflex liquid crystal display via the light guiding plate and the predetermined information to be displayed on the display screen will be past through are provided.

Thus, under the condition of poor outside light to the display screen of the reflex liquid crystal display, sufficient lights can be irradiated to the display screen by the lighting means and simultaneously, the lighting means can be easily removed from the display unit when carrying this.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) General Construction of Notebook Personal Computer

Figure 1:
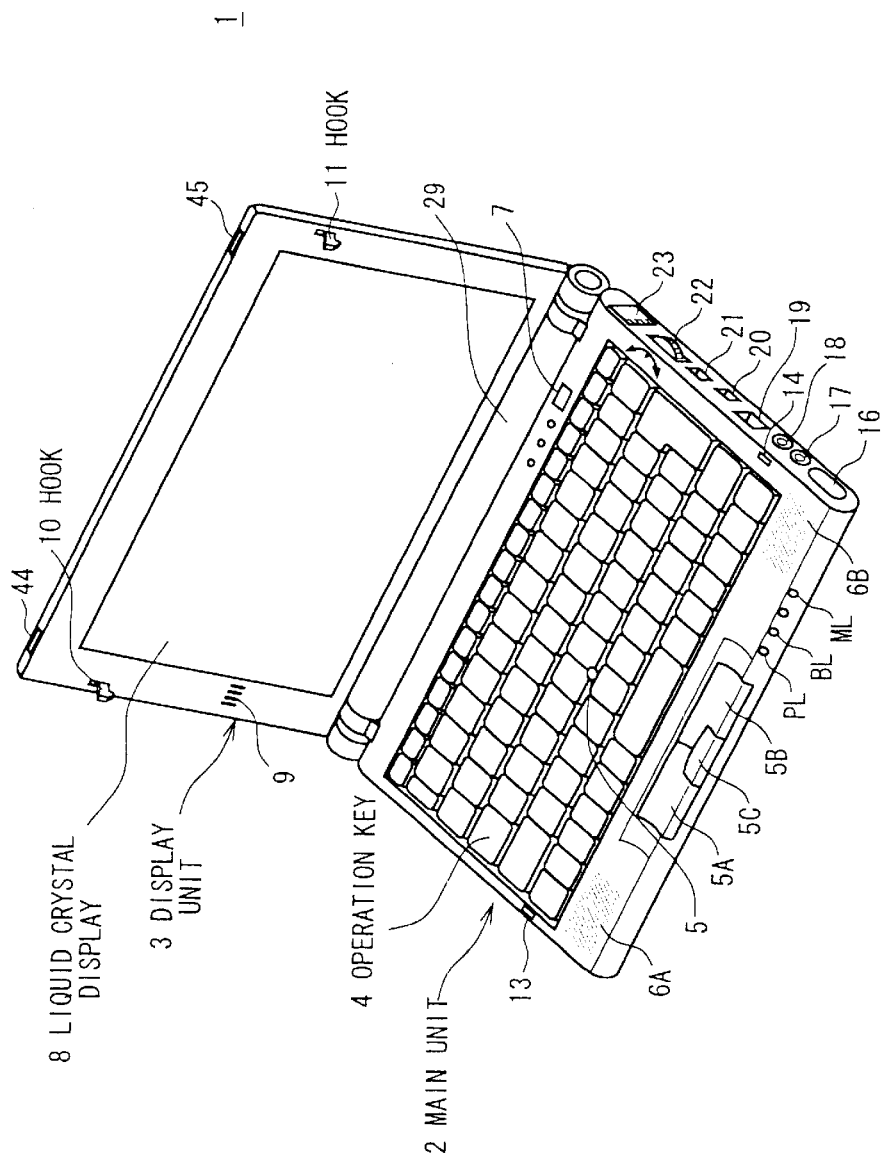
FIG. 1 is a brief linear perspective view showing one embodiment of the general construction of a notebook type personal computer according to the present invention.

In FIG. 1, 1 generally shows a notebook PC comprising the information processing device of the present invention and this is comprised of a main unit 2 and a display unit 3 which is attached open-close free to the main unit 2.

In the main unit 2, the plural number of operation keys 4 for entering various characters, symbols and numbers, a stick-type pointing device (hereinafter referred to as only stick) 5 to be used for moving the mouse cursor, a left click button 5A and a right click button 5B which are equivalent to the left button and the right button in the normal mouse, a center button 5C for operating the scroll bar without fitting the mouse cursor to the scroll button, built-in speakers 6A and 6B, and a press-type power source switch 7 are provided on the upper surface.

On the display unit 3, a reflex type liquid crystal display 8 is provided on the front surface and at the same time a microphone 9 is provided in the vicinity of left side and sounds can be collected via the microphone 9.

Furthermore, in the display unit 3, hooks 10 and 11 are provided in the vicinity of left side and in the vicinity of right side of the liquid crystal display 8 respectively. And holes 13 and 14 are provided on the predetermined positions corresponding to hooks 10 and 11 of the main unit 2. And these hooks 10 and 11 will be fit into the corresponding holes 13 and 14 respectively when the display unit 3 is blocked to the main unit 2.

On the other hand, by lifting the front side of the display unit 3 closed to the main unit 2, hooks 10 and 11 fit to the holes 13 and 14 can be removed easily. And thus, the display unit 3 can be opened up to the main unit 2. Moreover, on the front surface of the main unit 2, Light Emitting Diode (LED) such as a battery lamp BL and message lamp ML are provided.

Furthermore, on the right side surface of the main unit 2, an infrared port 16 compliant with the Infrared Data Association (IrDA), a headphone terminal 17, an input terminal for microphone 18, universal serial bus (USB) terminal 19, external power source connector 20, connector for external display 21, a jog dial 22 capable of entering the command for executing the predetermined processing by turning or pushing the dial, and a modem terminal for modular jack 23 are provided.

Figure 2:
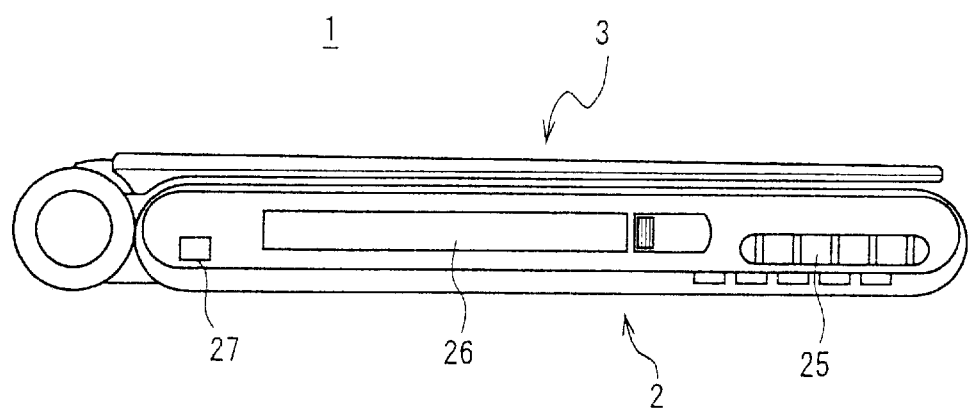
FIG. 2 is a brief linear side view showing the construction of left side surface of the main unit.

On the other hand, as shown in FIG. 2, on the left side surface of the main unit 2, an exhaust port 25, a PC card slot 26 compatible with the PC card of the Personal Computer Memory Card International Association (PCMCIA) standard, and a 4-pin capable Institute of Electrical and Electronics Engineers (IEEE) 1394 terminal 27 are provided.

Figure 3:
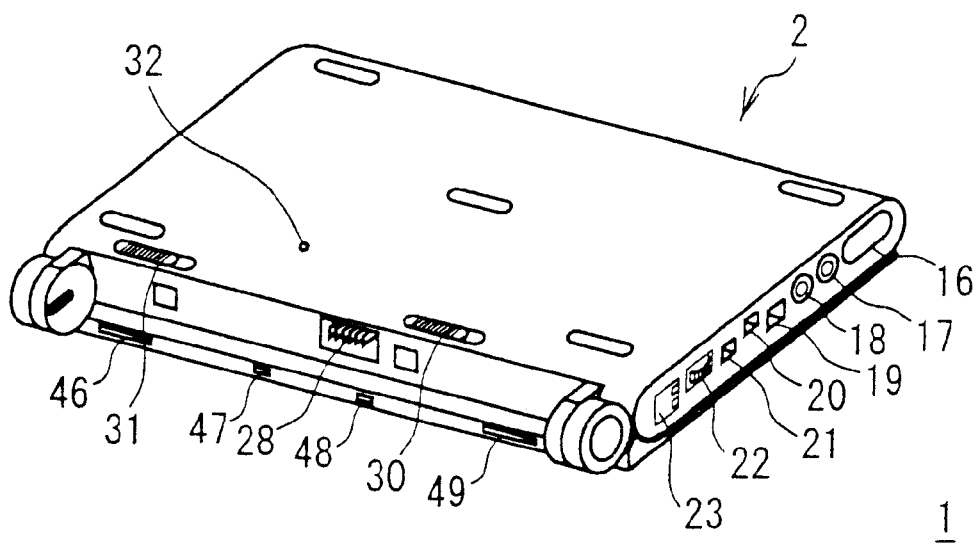
FIG. 3 is a brief linear perspective view showing the construction of the rear side surface and the bottom surface of the main unit.

Furthermore, as shown in FIG. 3, a battery connector 28 is provided on the rear side surface of the main unit 2. While on the bottom surface of the main unit 2, a sliding type removing lever 30 for removing the battery pack 29 (FIG. 1) and a lock lever 31 for locking the slide of the sliding type removing lever 30 are provided. And also a reset switch 32 for reconstructing the environment when stopping the operation and putting in the power source is provided. This battery pack 29 is connected removable free to the battery connector 28.

Figure 4:
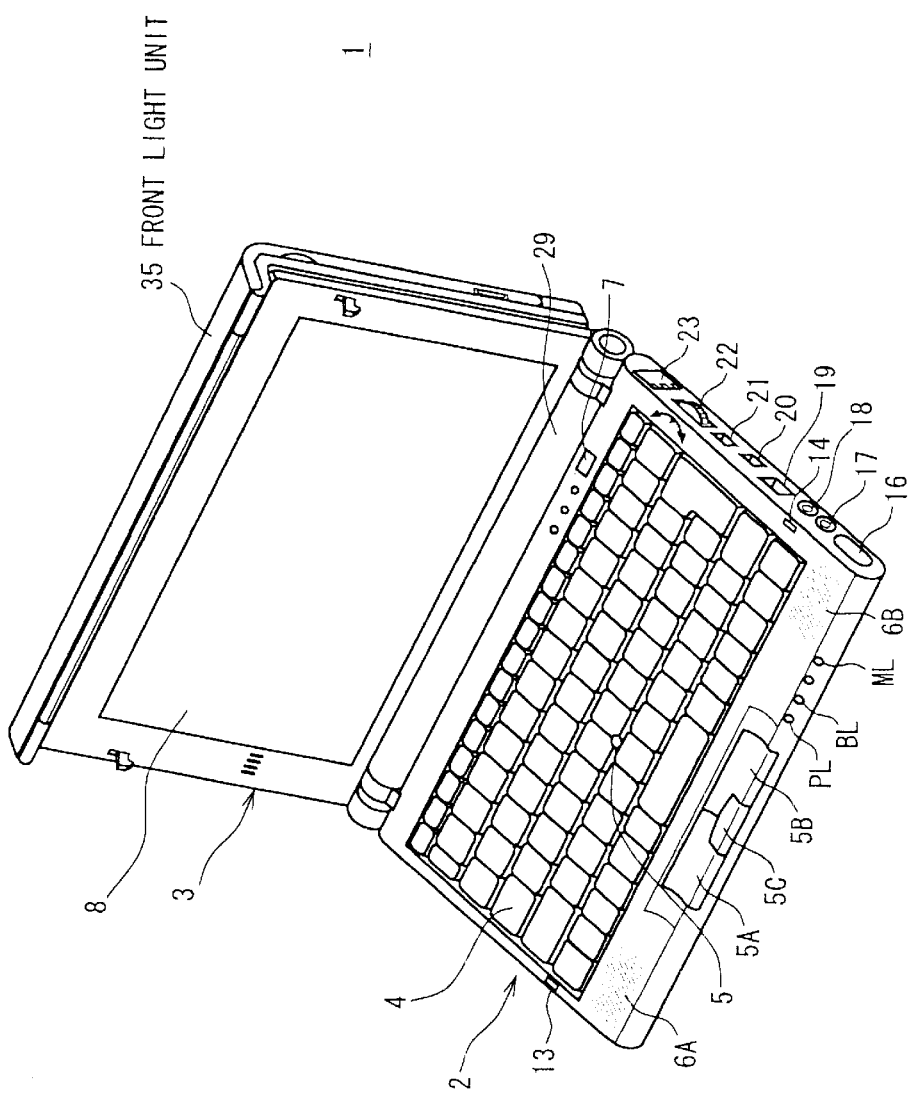
FIG. 4 is a brief linear perspective view showing the construction of a notebook personal computer equipped with a front light unit.

(2) Construction of Front Light Unit Moreover, in the case of the notebook PC 1, the front light unit 35 attached removable-free to the rear surface of the display unit 3 as shown in FIG. 4. Here, the front light unit 35 lights up the reflex liquid crystal display 8 from the front side thus preventing the visibility of the liquid crystal display 8 from becoming poorer under the condition of low outside light.

Figure 5:
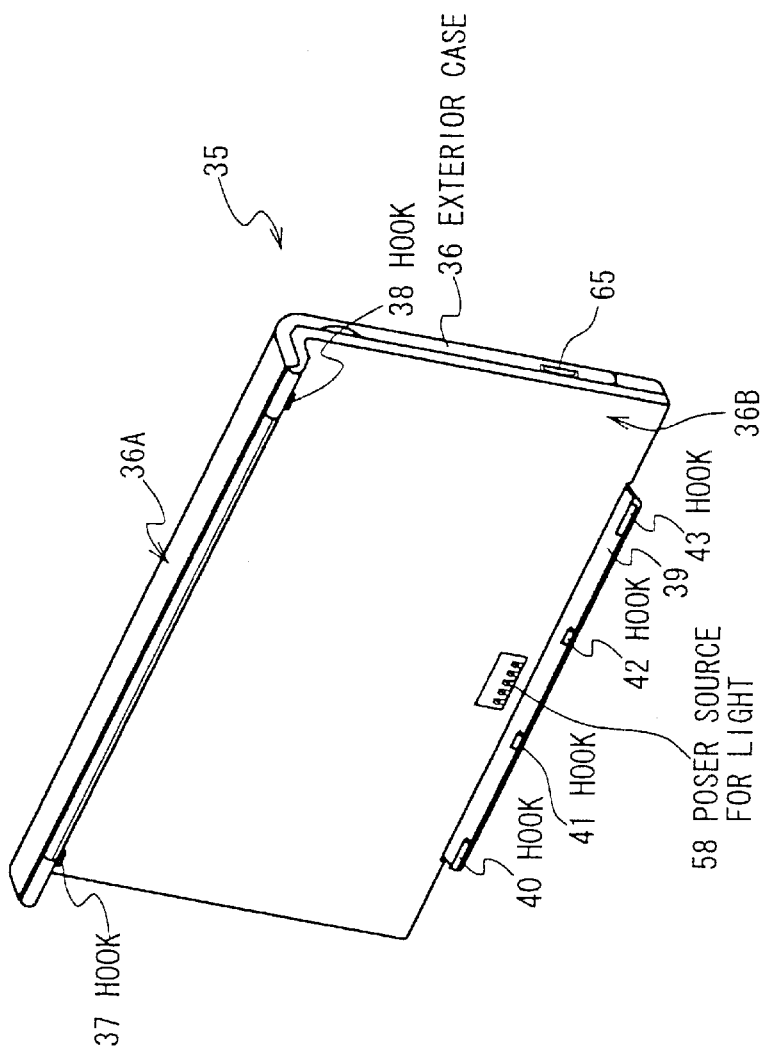
FIG. 5 is a brief linear perspective view showing the construction of a front light unit.

More specifically, as shown in FIG. 5, in the front light unit 35, hooks 37 and 38 are provided inside of the shoulder unit 36A of the L-shaped exterior case 36. Moreover, at the tip of the leg unit 36B of the exterior case 36 a plate-shaped projection unit 39 is provided, and hooks 40 to 43 are provided on the projection unit 39.

On the other hand, in the display unit 3, concave parts 44 and 45 (FIG. 1) corresponding to hooks 37 and 38 of the exterior case 36 are provided on the upper side surface. And also concave parts 46 to 39 (FIG. 3) corresponding to the hooks 40 to 43 of the projection unit 39 are provided on the bottom surface.

With this arrangement, when the front light unit 35 is pressed to the rear surface of the display unit 3 (FIG. 4) sandwiched from the top and bottom by the shoulder unit 36A and the projection unit 39 of the exterior case 36, hooks 37, 38, 40 to 43 are fit into the corresponding concave parts 44 to 49 respectively. And thus, the front light unit 35 is attached and is integrated into the display unit 3.

In this case, since the front light unit 35 is attached to the rear surface, the display unit 3 can be opened/closed to the main unit 2 even in a state in which the front light unit 35 is attached. Accordingly, in the notebook PC 1, even in the case where the front light unit 35 is attached to the display unit 3 and the main unit 2 is closed by the display unit 3, the main unit 2, the display unit 3 and the front light unit 35 are integrated into one piece and can be carried around easily.

Figure 6:
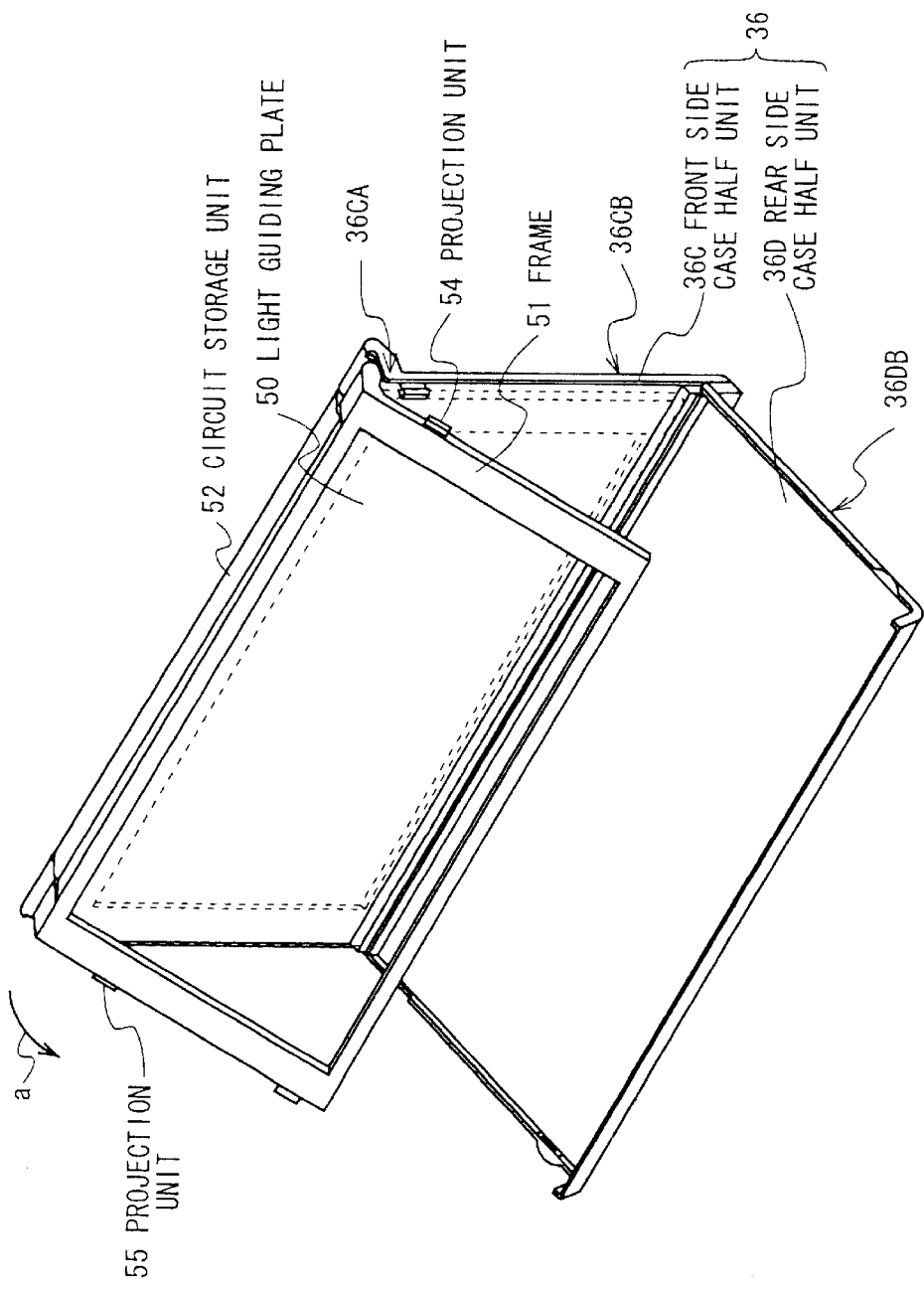
FIG. 6 is a brief linear perspective view illustrating the turning state of the light guiding plate stored in the exterior case.

Furthermore, as shown in FIG. 6, in the front light unit 35, the exterior case 36 is comprised of a front side case half unit 36C and a rear side case half unit 36D. The tip of the leg part 36DB of the rear side case half unit 36D is supported at the edge of the leg part 36CB of the front side case half unit 36C rotation-free in the direction going farther from the front side case half unit 36C shown by an arrow a and contrary to this, in the direction coming closer to this front side case half unit 36C, and thus, the rear side case half unit 36D can be opened or closed to the front side case half unit 36C.

Moreover, a frame 51 for holding the light guiding plate 50 having almost the same shape and the size as the display screen of the liquid crystal display 8 is stored in the inside space of the exterior case 36. Moreover, one edge of the width direction of the circuit storage unit 52 having the rectangular cross section is supported at the edge of the shoulder part 36CA of the front side case half unit 36C rotation free in the arrow a direction and in the opposite direction. And at the other edge in the width direction of the circuit storage unit 52, the upper side edge of the frame 51 is supported rotation free in the arrow a direction and in the opposite direction.

Figure 7:
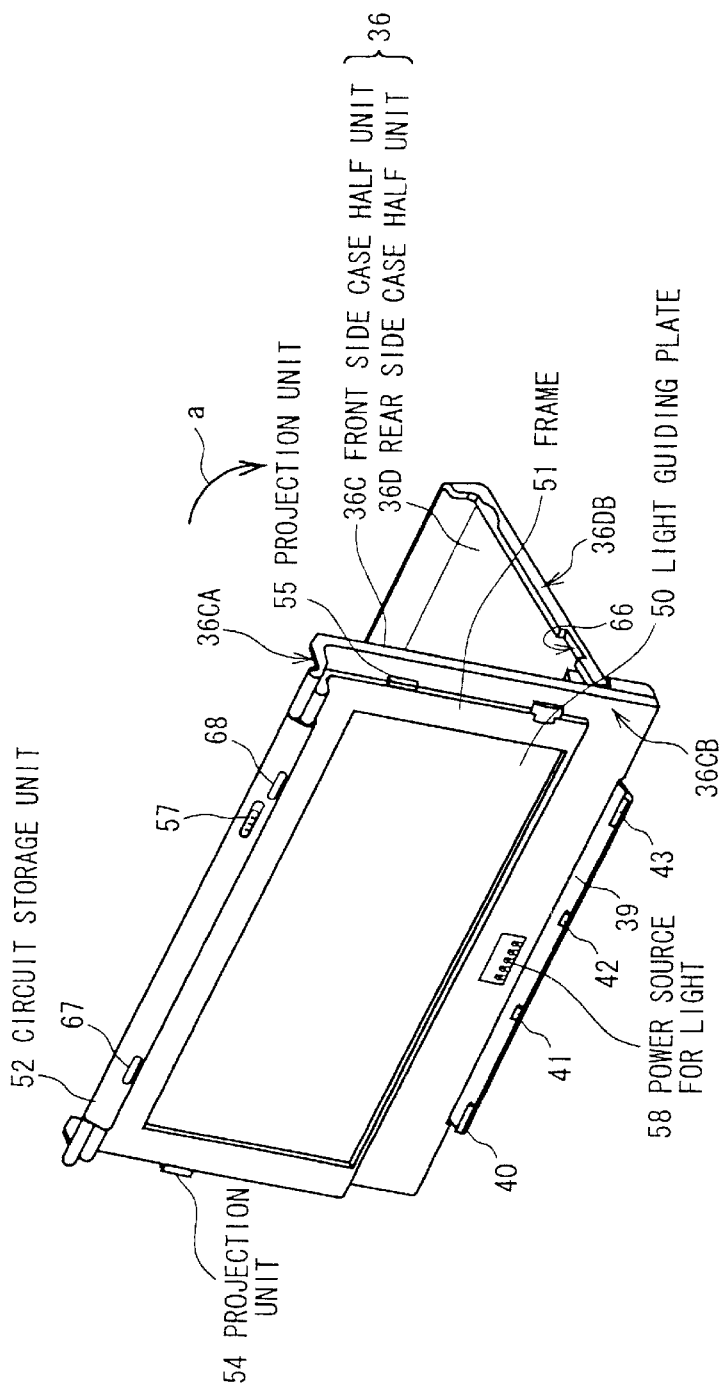
FIG. 7 is a brief linear perspective view illustrating the turning state of the light guiding plate stored in the exterior case.

Thus, as shown in FIG. 7, the frame 51 can rotate freely between 360° in a state in which the rear side case half unit 36D is opened to the front side case half unit 36C from the condition where one surface of the light guiding plate 50 is kept in parallel with the inside of the leg unit 36CB of the front side case half unit 36C to the condition where one surface of the light guiding plate 50 is kept in parallel with the outside of the leg part 36CB of the front side case half unit 36C.

In this connection, in the exterior case 36, when the frame 51 is taken out from the inside space, the rear side case half unit 36D can be closed to the front side case half unit 36C.

Figure 8:
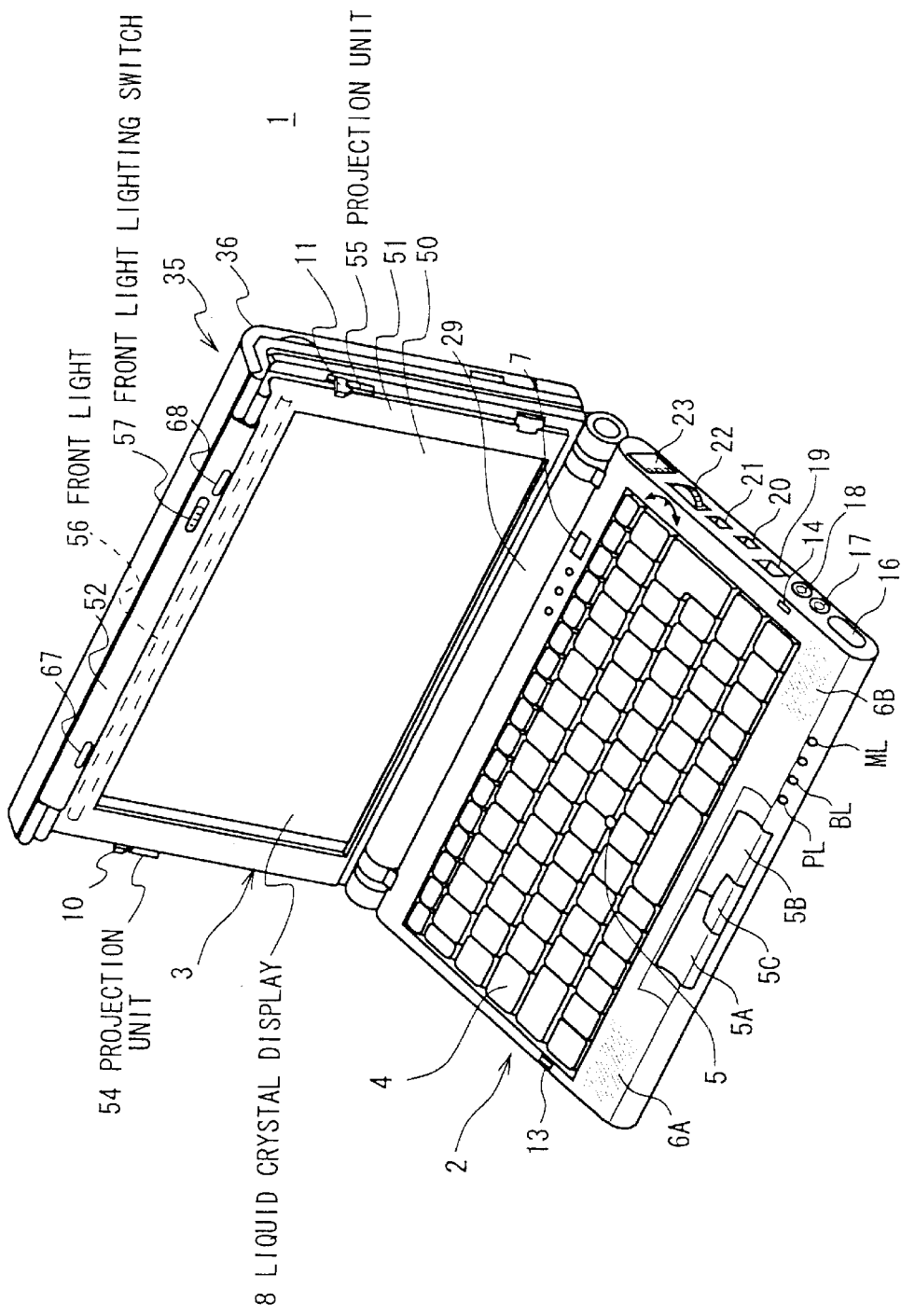
FIG. 8 is a brief linear perspective view illustrating the holding state of the light guiding plate in the display unit.

At this point, as shown in FIG. 8, on the right and left edges of the frame 50, projection parts 54 and 55 corresponding to the hooks 10 and 11 provided in the display unit 3 are provided. And in the display unit 3, when the frame 50 is taken out under the condition in which the front light unit 35 is attached, projection units 54 and 55 are connected by the corresponding hooks 10 and 11 respectively and the frame 51 is held in a state in which the light guiding plate 50 is piled over the display screen of the liquid crystal display 8. Thus, the display unit 3 can hold the frame 51 without using any special holding systems but using hooks 10 and 11 to be used when closing the main unit 2.

Figure 9:
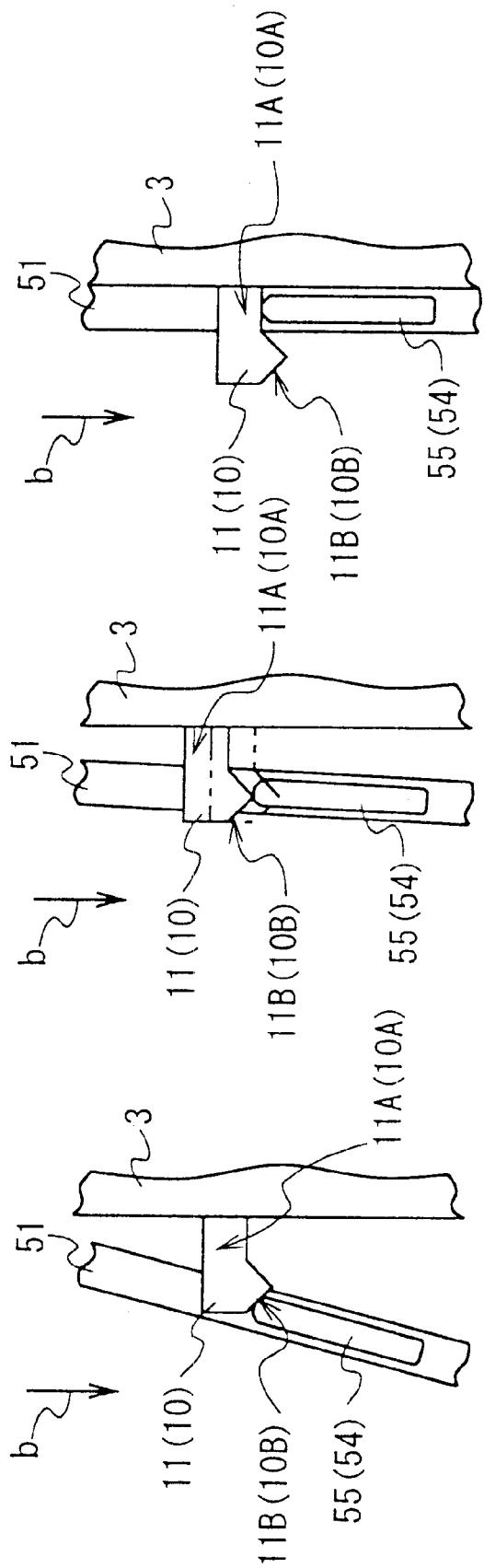
FIGS. 9A to 9C are brief linear side views illustrating the fitting state between the hook and projection unit.

More specifically, as shown in FIGS. 9A to 9C, hooks 10 and 11 of the display unit 3 are formed in the L-shape and leg units 10A and 11A are urged in the downward direction shown by an arrow b by the coil spring (not shown in Fig.) provided inside of the display unit 3. Furthermore, fitting parts 10B and 11B of the hooks 10 and 11 are formed in the mountain shape.

On the other hand, upper side edges of the projection units 54 and 55 of the frame 51 are formed in round shapes. Accordingly, when the frame 51 turns in the direction getting closer to the front surface of the display unit 3, the upper side edges of the projection units 54 and 55 are pressed onto the slants of the fitting units 10A and 11B of the hooks 10 and 11 (FIG. 9A), the hooks 10 and 11 are lifted along the holes (FIG. 9B). And when these are attached to the front surface of the display unit 3, hooks 10 and 11 drop downward by the urging power of the coil spring and thus, the hooks 10 and 11 are connected and fit to the projection units 54 and 55 and held (FIG. 9C).

In this connection, even when the frame 51 turns in the direction going farther from the front surface of the display unit 3, lifting the hooks 10 and 11 once by the projection units 54 and 55, the frame 51 can release the connection of the hooks 10 and 11 to the projection units 54 and 55 easily, and can turn in the direction going farther from the front surface of the display unit 3.

In the front light unit 34 (FIG. 8), a light source such as cathode ray tube (hereinafter referred to as front light) 56 is built in at the upper side edge of the frame 51. Moreover, the inverter circuit (not shown in Fig.) to control the lighting up of the front light 56 is stored in the circuit storage unit 52 and also a switch for lighting up the front light 57 is provided on its surface.

Figure 10:
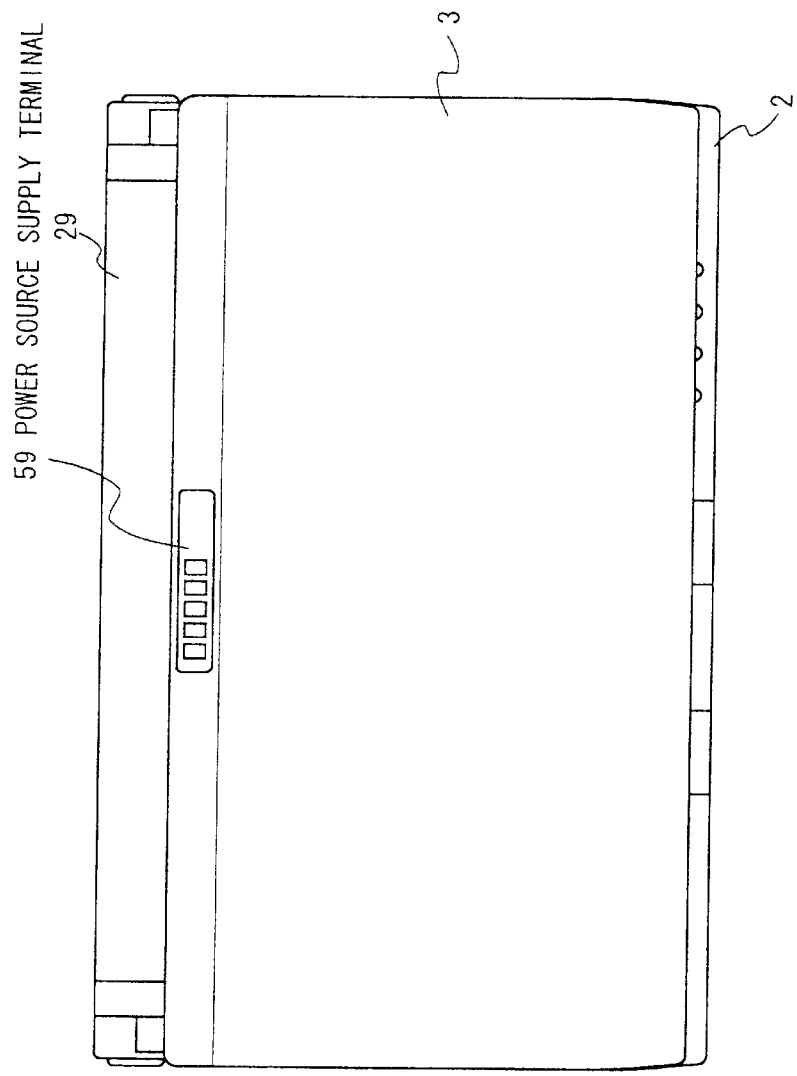
FIG. 10 is a brief linear rear side view showing the power source supply terminal provided on the back surface of the display unit.

Furthermore, the front light unit 35 (FIGS. 6 and 7) is provided with a power source terminal for light 58 on the outside surface of the leg unit 36CB of the front side case half unit 36C. And the power source terminal for light 58 is electrically connected to the inverter circuit. Moreover, as shown in FIG. 10, a power source supply terminal 59 corresponding to the power source terminal for light 58 is provided on the rear surface of the display unit 3, and by attaching the front light unit 35 to the rear surface, the power source supply terminal 59 will be electrically connected to the power source terminal for light 58.

Thus, in the front light unit 35 (FIG. 8), the power source is supplied from the power source supply terminal 59 of the display unit 3 to the inverter circuit via the power source terminal for light 57 and switching ON the switch for front light lighting-up 57, the front light 56 is lighted up. Then, in the front light unit 35, the illumination light to be obtained by lighting up the front light 56 is irradiated onto one edge side (i.e., the upper side edge) of the light guiding plate 50 held to the frame 51.

Figure 11:
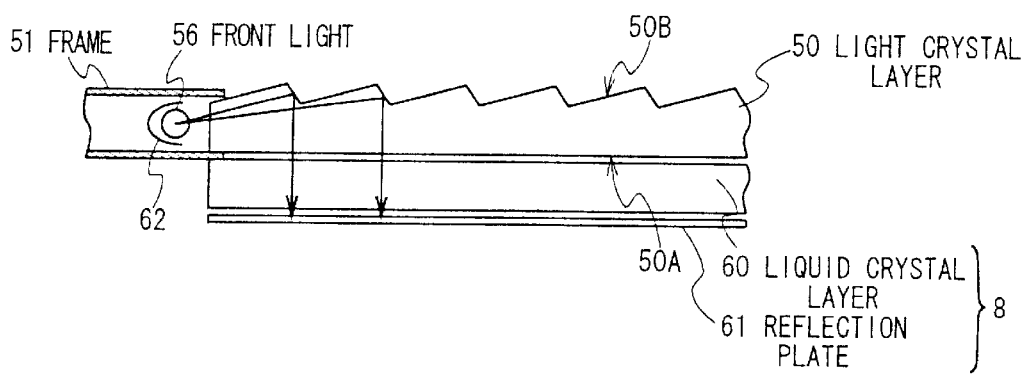
FIG. 11 is a brief linear cross sectional view showing the construction of the light guiding plate.

As shown in FIG. 11, in the light guiding plate 50, one surface 50A of the side opposing to the display screen of the liquid crystal display 8 is formed in plain by the transparent acrylic resin, and the other side edge opposing to the surface 50A (surface of the front side of the display unit 3) is formed in saw blade shape.

As to the other surface 50B of the light guiding plate 50, the angle of inclination of the slope surface facing to one edge side on which the front light 56 is placed is relatively shallow and the angle of inclination of the slope surface facing to the other edge side is formed in the saw blade shape having the steep slope angle. And since the angle of inclination of saw blade shape of the other surface 50B and the overall thickness of the light guiding plate 50 will be selected as occasion demands, the light guiding plate 50 can reflects the illumination light to be irradiated from the other edge side by lighting up the front light 58 at the other edge 50B and irradiate the light evenly over the entire surface (i.e., overall surface of the display screen) of the liquid crystal layer 60 of the liquid crystal display 8.

With this arrangement, the illumination light injected into the liquid crystal layer 60 (i.e., display screen) of the liquid crystal display 8 reflects at the reflection plate 61 placed on the rear surface side of the liquid crystal layer 60. And the reflected light passes through the liquid crystal layer 60 again and outputs to the front surface side of the display unit 3. Thus, in the front light unit 35, the display screen of the reflex liquid crystal display 8 can be lighted even under the poor outside lighting condition and its visibility can be prevented from getting spoiled. In this connection, a reflecting plate 62 having the U-shaped cross section is placed in the vicinity of the front light 56, and a part of illuminating light to be obtained by lighting up the front light unit 35 is reflected to the one edge side of the light guiding plate 50 via the reflecting plate 62. And thus, the illuminating efficiency of the light to the light guiding plate 50 can be improved.

In the front light unit 35, it is considered that one surface 50A and the other surface 50B of the light guiding plate 50 would be scratched or stained by the user when he touches the one surface 50A and the other surface 50B of the light guiding plate 50 by his finger, and the reflecting efficiency of the light at the part scratched or stained would be decreased.

Figure 12:
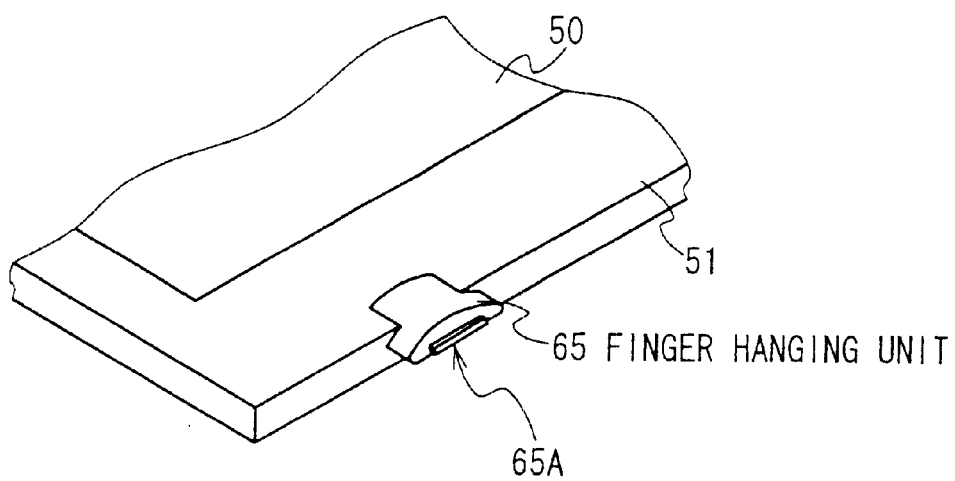
FIG. 12 is a brief linear perspective view showing a part of finger hanging unit.

Accordingly, in the front light unit 35, a finger hanging unit 65 with the plate shape is provided on the upper side edge of the frame 51 as shown in FIG. 12, and the user can turn the frame 51 by hanging his finger onto the finger hanging unit 65 or the user picking up the finger hanging-unit 65 by his finger. Thus, when the frame 51 is in action, one surface 50A and the other surface 50B of the light guiding plate 50 are prevented from being touched by the user's finger.

In this connection, in the front light unit 35 (FIG. 7), a notch 66 corresponding to the finger hanging unit 65 of the case 51 is formed on the right side surface of the rear side case half unit 36D. And when the frame 51 is stored in the exterior case 36 (FIG. 5), the finger hanging unit 65 of the frame 51 is placed in the notch 66. And thus, the exterior case 36 can be prevented from becoming large sized for storing the finger hanging unit 65 with the frame 51.

Furthermore, a belt-shaped projection part 65A is provided at the tip of the finger hanging unit 65 (FIG. 12). Thus, in the front light unit 35, even if the frame 51 is attached to the inside of the front side case half unit 36 when the rear side case half unit 36D is opened to the front side case half unit 36C, the frame 51 can be easily turned by pressing the finger against the tip part of the finger hanging unit 65 from the right side surface of the front light unit 35 hanging the finger tip to the projection unit 65A.

In the front light unit 35 (FIG. 8), when the frame 51 is taken out from the exterior case 36 and the frame 51 is held in the display unit 3, the circuit storage unit 52 is fixed so that its width direction faces in a slanting downward direction of the front side.

Figure 13:
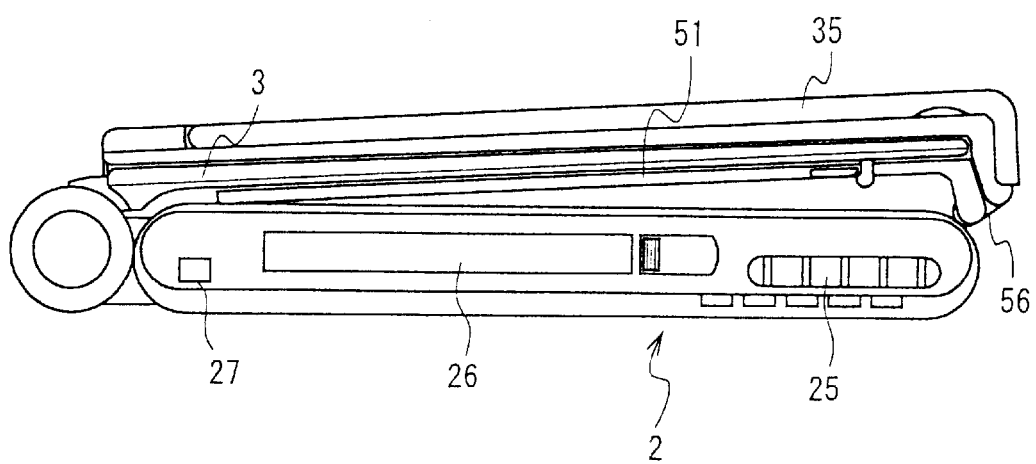
FIG. 13 is a brief linear side view illustrating the closing of main unit by the display unit holding the frame.

Thus, in the front light unit 35, as shown in FIG. 13, even if the display unit 3 holding the frame 51 turns to close the main unit 2, the angle of rotation of the display unit 3 is regulated so that the circuit storage unit 52 dashes against the upper surface front side of the main unit 2. And thus the light guiding plate 50 is prevented from being pressed against the upper surface of the main unit 2 and the operation key 4 and the other surface 50B of the light guiding plate 50 can be prevented from getting scratched. In this connection, sheet-type rubber materials 67 and 68 are attached to the part at which the display unit 3, turning to close the main unit 2, contacts to the upper surface of the main unit 2. And thus, these rubber materials 67 and 68 absorb the shock when the circuit storage unit 52 hits the upper surface of the main unit 2 and breakages of both units can be also prevented.

In the case of this embodiment, in the front light unit 35, when the light guiding plate 50 is stored in the exterior case 36 with the frame 51, the part on which a switch for front light lighting-up of the circuit storage unit 52 is placed will be stored inside of the exterior case 36. Accordingly, when the front light unit 35 is carried around in a state being attached to the notebook PC 1, unnecessary lighting up of the front light 56 can be prevented.

(3) Circuit Construction of Notebook Personal Computer

Figure 14:
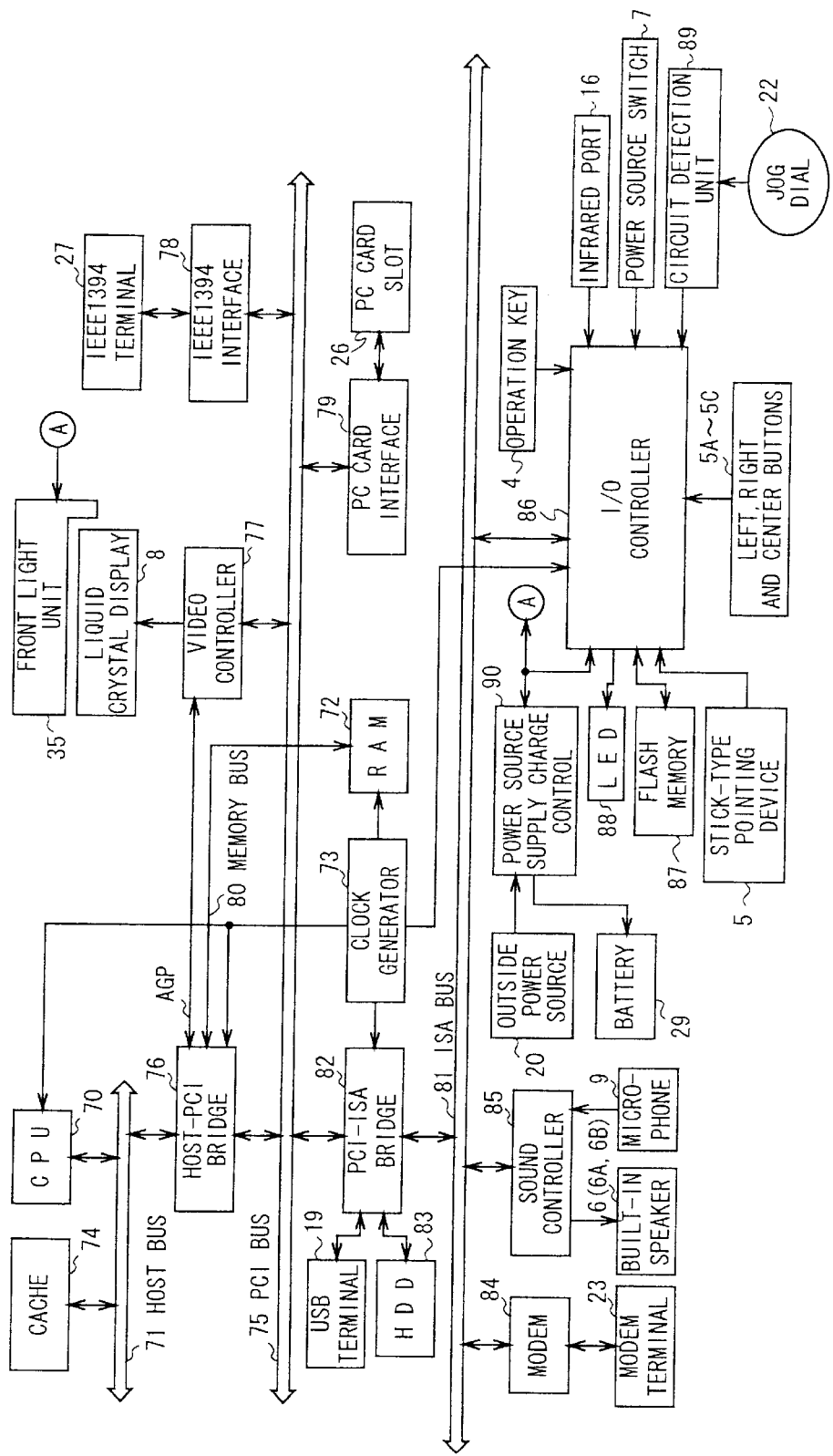
FIG. 14 is a block diagram showing the circuit construction of a notebook type personal computer.

As shown in FIG. 14, in the main unit 2 of the notebook type PC 1, Central Processing Unit (CPU) 70 for collectively controlling various functions of the main unit 2 is connected to the host bus 71, and by executing the processing according to various programs and application softwares loaded on the Random Access Memory (RAM) 72 by the CPU 70 based on the system clock to be given from the clock generator 73 at the predetermined operating speed, various functions can be realized.

Moreover, the cache memory 74 is connected to the host bus 71 and this host bus 71 caches data to be used by the CPU 70 and high velocity accessing can be realized.

The host bus 71 is connected to the Peripheral Component Interconnect (PCI) bus 75 via the host-PCI bridge 76, and video controller 77, Institute of Electrical and Electronics Engineers (IEEE) 1394 interface 78 and personal computer (PC) card interface 79 are connected to the PCI bus 75.

Here, the host-PCI bridge 76 controls receptions of various data to be conducted between the CPU 70 and the video controller 77, IEEE 1394 interface 78 and the PC card interface 79, and also conducts the memory control of the RAM 72 connected via the memory bus 80.

Furthermore, the host-PCI bridge 76 is connected to the video controller 77 via the signal line along the accelerated graphics port (AGP). Thus, image data can be transmitted at high speed between the host-PCI bridge 76 and the video controller 77.

The video controller 77 stores image data based on various application softwares to be supplied as necessary in the built-in video random access memory (VRAM) and reads these out as required. And by sending these out to the liquid crystal display 8, the plural number of window screens can be displayed.

The PC card interface 79 is to be equipped when adding optional features via the PC card as occasion demands, and can be connected to the external device such as the CD-ROM drive and the DVD drive via the PC card.

The IEEE1394 interface 78 is directly connected to the IEEE1394 terminal 27 and can be connected to the external devices such as other computer devices and digital video camera.

The PCI bus 75 is connected to the Industrial Standard Architecture (ISA) 81 via the PCI-ISA bridge 82 and the hard disc drive (HDD) 83 and universal serial bus (USB) terminal 19 are connected to the PCI-ISA bridge 82.

Here, the PCI-ISA bridge 82 is comprised of Integrated Drive Electronics (IDE) interface, configuration register, Real-Time Clock (RTC) circuit and USB interface and controls the HDD 83 via the IDE interface based on the system clock to be given from the clock generator 73.

In the hard disc of the HDD 83, the operating system (OS) such as Windows98 (trade mark), electronic mail program, auto pilot program, jog dial utility program, jog dial driver, capture software and digital map software are memorized. And in addition to these, various application softwares are also memorized in the hard disc of the HDD 83, and these will be transmitted on the process of start processing.

Furthermore, the PCI-ISA bridge 82, as well as controlling the external devices such as the floppy disc drive, printer and USB mouse (not shown in Fig.) which are connected via the USB terminal 19, through the USB interface, controls the modem 84 and sound controller 85 to be connected to the ISA bus 81.

The modem 84 will be connected to the Internet service provider (hereinafter referred to as provider) from the modem terminal 23 via the public telephone line (not shown in Fig.) and Internet, and conducts the accessing with the provider. The sound controller 85 conducts the capture of audio signal from the microphone 9 and the supply of audio signal to the built-in speakers 6A and 6B.

Furthermore, the ISA bus 81 is connected with In/Out (I/O) controller 86, and receives the supply of electric power from the external power source connector 84 via the power source supply charge control circuit 85, and supplies the electric power to each circuit when the power source switch is put ON. And here, also the I/O controller 86 functions based on the system clock to be supplied from the clock generator 73.

Moreover, the electric power source supply charge control circuit 85 is controlled by the I/O controller 86 and controls the charging of battery pack 29 connected to the battery connector 28 (FIG. 3)

This I/O controller 86 is comprised of a micro-controller, I/O interface, CPU, ROM and RAM, and controls the input/output of data among OS, application software and various peripheral equipments such as the liquid crystal display 8 and the HDD 83 based on the basic input/output system (BIOS) stored in the flash memory 87.

Furthermore, the I/O controller 86 is connected to an infrared port 16, and is capable of conducting the infrared communications with the other computer devices.

In the ROM of the I/O controller 86 the wakeup program, key entering monitor program, LED control program, jog dial condition monitor program and various other control programs are stored.

The jog dial condition monitor program is a program associated with the jog dial utility program stored in the hard disc of the HDD 83 and monitors whether or not the jog dial 22 is rotation operated or push operated The wakeup program is a program that is controlled to execute the predetermined processing by the CPU 70 when the current time to be supplied from the RTC circuit in the PDI-ISA bridge 82 becomes the start time preset. And the key input monitor program is a program to monitor the operation key 4 and inputs from various other key switches.

The LED control program is a program to control the lighting of various lamps such as power source lamp PL, battery lamp BL, and message lamp ML, which are formed of light emitting diode (LED).

Furthermore, the RAM of the I/O controller 86 is equipped with a set time register of wakeup program, a key input monitor register for key input monitoring program, a LED control register for LED control program, an I/O register for jog dial condition monitoring program, and registers for various other programs.

The set time register stores the time information of the start time optionally set by the user in advance in order to use in the wakeup program. Accordingly, the I/O controller 86 judges whether or not the current time to be supplied from the RTC circuit based on the wakeup program becomes the optionally set start time, and when it becomes the start time, the I/O controller 86 notifies this to the CPU 70. Thus, when it becomes the start time, the CPU 70 informs this to the CPU 70. Thus, when the start time arrives, the CPU 70 rises the preset application software and executes the predetermined processing according to the application software.

The key input monitor register stores operation key flags based on the input of operation key 4, stick 5, left click button 5A, right click button 6B and center button 5C.

Accordingly, the I/O controller 86 judges whether the pointing operation by the stick 5, or the click operation of left click button 5A, right click button 5B and center button 5C are conducted or not. And when the pointing operation and click operation are conducted, notifies this to the CPU 70.

At this point, the pointing operation is an operation to transfer the mouse cursor to the desired position by pressing the stick 5 up and down, right and left by the finger. And the click operation is an operation to press the left click button 5A or the right click button 5B by the finger rapidly and release the finger.

With this arrangement, the CPU 70 executes the predetermined processing according to the movement of the mouse cursor by the pointing operation and the click operation.

The LED control register stores the light-up flag showing the lighting condition of various lamps formed of LED such as the power source lamp PL, the battery lamp BL, and the message lamp ML.

Accordingly, the I/O controller 86 stores the light-up flag when the CPU 70 reads out the electronic mail program from the hard disc of the HDD 33 by the push operation of the jog dial 22 and rises this on the RAM 72 and receives the electronic mail according to the electronic mail program. And simultaneously, by controlling the LED 88 based on the light-up flag, lights up the message lamp ML.

The I/O register for jog dial condition monitor program stores the rotation operation flag and the push operation flag according to the rotation operation and the push operation conducted to the jog dial 22 respectively.

Accordingly, when the user desired menu item is selected from among the plural number of menu items by rotation operating and push operating the jog dial 22 connected via the rotation detection unit 89, the I/O controller 86 stores the rotation operation flag and the push operation flag in the I/O register and informs this to the CPU 70.

Thus, the CPU 70 rises the application software pertaining to the menu item determined by the rotation operation and push operation of the jog dial 22 according to the jog dial utility program read out from the HDD 83 and in operation on the RAM 72, and conducts the predetermined processing.

At this point, the I/O controller 86 constantly operates based on the jog dial condition monitor program by the control of the power source supply charge control circuit 90 even when the power source switch is OFF and the OS is not under operating condition. And the I/O controller 86 can start the user desired application software and the script file by the push operation of the jog dial 22 even in the power saving state or when the power source is off not proving a specific key.

Moreover, the power source supply charge control circuit 90 is connected to the power source terminal for light 58 (FIGS. 5 and 7) of the front light unit 36 via the power source supply terminal 59 (FIG. 10) and supplies the power source for supplying the front light 56 (FIG. 8) to the front light unit 35. Thus, in the front light unit 35, the front light 56 can be lighted up.

(4) Operation and Effects of the Embodiment

According to the foregoing construction, in the notebook PC 1, the reflex type liquid crystal display 8 is provided on the display unit 3 and the front light unit 35 is attached removable free to the rear surface side of the display unit 3. Then, in the notebook PC 1, in the case of using the front light unit 35 under the poor lighting condition to the reflex liquid crystal display 8, the light guiding plate 50 stored in the exterior case 36 is taken out by being rotated with the frame 51 holding the light guiding plate 50, and the light guiding plate 50 is placed over the display screen of the liquid crystal display 6 in the front surface of the display unit 3.

Under such condition, in the notebook PC 1, by switching ON the switch for front light lighting 57 of the front light unit 35, the front light 56 built in the frame 51 is lighted up, the illumination light to be obtained from the front light 56 is reflected via the light guiding plate 50, and thus, overall display screen of the liquid crystal display 8 will be illuminated evenly.

Accordingly, in the notebook PC 1, under poor lighting condition in which the visibility to the display screen of the reflex liquid crystal display 8 is spoiled, the quantity of light to illuminate the display screen of the reflex liquid crystal display 8 can be increased by using the front light unit. And thus, visibility of the display screen of the liquid crystal display 8 can be prevented from becoming spoiled.

Furthermore, when carrying this notebook PC 1, this can be easily carried in a state in which the display unit 3 is closed to the main unit 2. In this connection, in such notebook PC 1, since the reflex type liquid crystal display 8 is used, the display unit 3 can be made remarkably thin and light weighted as compared with the notebook PC equipped with the translucent liquid crystal display. And thus, the portability of the notebook PC can be remarkably improved.

Furthermore, when it is required to use the front light unit 35 at the destination to which it is carried, if the light guiding plate 50 is stored in the exterior case 36, the notebook PC 1 can be easily carried even in a state in which the display unit 3 is closed to the main unit 2 and by attaching the front light unit 35 to the display unit 3. And thus, in the case of carrying the notebook PC 1 and the front light unit 35 as a piece, in the front light unit 35, storing the light guiding plate 50 in the exterior case 36, surfaces 50A and 50B of the light guiding plate 50 can be almost certainly prevented from getting scratched or stained on the way being carried.

According to the foregoing construction, since lights are irradiated evenly over the display screen of the reflex liquid crystal display 8 provided on the display unit 3, and the front light 56 having the light guiding plate 50 to transmit the predetermined information to be displayed on the display screen of the liquid crystal display 8 is attached removable free to the display unit 3, sufficient lights to the display screen of the reflex liquid crystal display 8 can be secured even under the poor lighting condition, and also the front light unit 35 can be removed when carrying the notebook PC 1. And thus, the notebook PC equipped with the reflex liquid crystal display can be easily carried around.

(5) Other Embodiments

The embodiment described above has dealt with the case of forming the other surface 50B of the light guiding plate 50 in saw blade shape. However, the present invention is not only limited to this but also, provided that the illumination light to be obtained from the front light 56 can be irradiated evenly over the display screen of the liquid crystal display 8 and transmitted through, it can be formed in various other shapes such as forming over the other surface of the light guiding plate in taper shape.

Furthermore, the embodiment described above has dealt with the case of forming the light guiding plate 50 by the transparent acrylic resin. However, the present invention is not only limited to this but also it can be formed by various other materials such as transparent glass substrate.

Furthermore, the embodiment described above has dealt with the case of providing a finger hanging unit 65 on the right side edge part of the frame 51 in the front light unit 35. However, the present invention is not only limited to this but also the finger hanging unit can be provided on the left side edge part or on both right and left side edges.

Moreover, the embodiment described above has deal with the case of providing the illuminating device and the predetermined light source and a light guiding plate for guiding lights to be obtained from the light source according to the present invention, and applying the front light unit 35, described above in FIG. 8, as the lighting means that is attached removable free to the display unit so that the light is irradiated evenly over the surface of the display screen of the reflex liquid crystal display via the light guiding plate, and the predetermined information to be displayed on the display screen is transmitted through. However, the present invention is not only limited to this but also the illuminating device having various different constructions can be applied such as applying the frame 51 having built-in front light 56 as the illuminating device or adding the circuit storage unit 52 to the illuminating device and applying as the illuminating device, and the illuminating device can be directly attached removable free on the front surface of the display unit 3. In such cases, the same effects as those of the embodiment described above can be obtained. Moreover, if the light guiding plate 50 is used, the light can be irradiated effectively to the display screen of the reflex liquid crystal display 8 with a small number of front lights 56 (such as one).

Furthermore, the embodiment described above has dealt with the case of applying the information processing device according to the present invention to the notebook PC 1 described above in FIG. 1. However, the present invention is not only limited to this but also it can be widely applied to the information processing device with various other constructions, provided that the information processing device equipped with the reflex liquid crystal display.

Furthermore, the embodiment described above has dealt with the case of applying the frame 51 as the holding means to hold the light source and the light guiding plate which are attached removable free to the reflex liquid crystal display, and so that light will be irradiated evenly over the display screen of the reflex liquid crystal display via the light guiding plate and the predetermined information displayed on the display screen will be transmitted through. However, the present invention is not only limited to this but also it can be applied widely to various other holding means, provided that the light source and the light guiding plate are attached removable free to the reflex liquid crystal display and can be held so that light can be irradiated evenly over the display screen of the reflex liquid crystal display and the predetermined information to be displayed on the display screen will be transmitted.

Moreover, the embodiment described above has dealt with the case of applying the exterior case 36 as the storage means attached removable free to the rear surface opposing to the front surface on which the display screen of the display unit is placed and holds the holding means rotation free and stores the holding means as occasion demands. However, the present invention is not only limited to this but also various other storage means can be widely applied if it is attached removable free to the rear surface opposing to the front surface on which the display screen of the display unit is placed and can hold the holding means rotation free and can store the holding means as occasion demands.

Furthermore, the embodiment described above has dealt with the case of applying the circuit storage unit 52 as the control means for regulating the angle of rotation of the display unit when the display unit is closed to the main unit under the condition in which the holding means is attached to the reflex liquid crystal display. However, the present invention is not only limited to this but also various other control means can be widely applied, provided that the angle of rotation of the display unit can be regulated when the display unit is closed to the main unit under the condition in which the holding means is attached to the reflex liquid crystal display.

Furthermore, the embodiment described above has dealt with the case of applying hooks 10 and 11 and projection units 54 and 55 as the fitting means to fit the holding means so that lights are irradiated evenly over the display screen of the reflex liquid crystal display via the light guiding plate, and the predetermined information displayed on the display screen will be transmitted through. However, the present invention is not only limited to this but also various other fitting means can be widely applied if the holding means can be fit so that lights are irradiated evenly over the display screen of the reflex type liquid crystal display via the light guiding plate and the predetermined information to be displayed on the display screen is transmitted through.

According to the present invention as described above, since in the illuminating device, the predetermined light source, the light guiding plate to guide the light obtained from the light source, and the holding means that is attached removable free to the reflex liquid crystal display and holds the light source and the light guiding plate so that it can illuminate the light evenly over the entire display screen of the reflex liquid crystal display via the light guiding plate and transmit the predetermined information to be displayed on the display screen are provided, sufficient lights can be applied over the entire display screen under the poor lighting condition to the display screen of the reflex liquid crystal display. And at the same time, since it can be detached when carrying the reflex liquid crystal display, the illuminating device capable of increasing the portability of the reflex liquid crystal display can be realized.

Furthermore, in the information processing device, since a main unit for executing the predetermined processing, a display unit attached open/close free to the main unit and equipped with a reflex liquid crystal display, predetermined light source, a light guiding plate for guiding lights to be obtained from the light source, and the lighting means to be attached removable free to the display unit in order to illuminate the light evenly over the entire display screen of the reflex liquid crystal display via the light guiding plate, and transmit the predetermined information to be displayed on the display screen are provided. Thus, even when the external light is scarce to the display screen of the reflex liquid crystal display, sufficient lights can be irradiated evenly over the display screen by the lighting means, and the lighting means can be easily detached from the display unit when carrying this. Thereby, the information processing device capable of increasing the portability even though it is equipped with the reflex liquid crystal display can be realized.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An illuminating device for displaying predetermined information onto a display screen comprising:

a predetermined light source;

a light guiding plate for guiding light to be obtained from said light source; and holding means removably attached to a reflex liquid crystal display for holding said light source and said light guiding plate so that said light is irradiated evenly over the entire display screen of said reflex liquid crystal display via the light guiding plate so that the predetermined information is displayed on said display screen.

2. The illuminating device according to claim 1, wherein said reflex liquid crystal display is provided in the display unit which is openable/closeable with respect to the main unit of the information processing device for conducting the predetermined processing.

3. The illuminating device according to claim 2 comprising:

storage means removably attached to a rear surface of the reflex liquid crystal display opposite to a front surface of the reflex liquid crystal display on which said display screen is placed, for holding and storing said holding means.

4. The illuminating device according to claim 3, wherein said holding means comprises a support tab which assists a user in moving a frame holding the light guiding plate.

5. The illuminating device according to claim 4 and further comprising:

control means for controlling the angle of rotation of the display unit when said display unit is closable onto said main unit under the condition in which said holding means is attached to said reflex liquid crystal display.

6. An information processing device for displaying predetermined information onto a display screen comprising:

a main unit for executing predetermined processing;

a display unit removably attached to said main unit and provided with a reflex liquid crystal display; and lighting means having a predetermined light source and a light guiding plate for guiding the light to be obtained from said light source and removably attached to said display unit in order that the light is irradiated evenly over the entire surface of the display screen of said reflex liquid crystal display through said light guiding plate so that the predetermined information is displayed on said display screen.

7. The information processing device according to claim 6, wherein said lighting means comprises a holding means for holding said light source and said light guiding plate; and said display unit comprises connecting means for connecting said holding means so that said light is irradiated evenly over the entire surface of the display screen of said reflex liquid crystal display via said light guiding plate so that the predetermined information is displayed on said display screen.

8. The information processing device according to claim 7, wherein said lighting means comprises storage means which is removably attached to a rear surface of the reflex liquid crystal display opposite to a front surface of the reflex liquid crystal display on which said display screen is placed, for holding and storing said holding means.

9. The information processing device according to claim 8, wherein said holding means comprises a support tab which assists a user in moving a frame holding the light guiding plate.

10. The information processing device according to claim 9, wherein said lighting means comprises control means for controlling the angle of rotation of said display unit when said display unit is closable onto said main unit under the condition in which said holding means is attached to said reflex liquid crystal display.

* * * * *